US012392650B2

United States Patent
Dieterle et al.

(10) Patent No.: US 12,392,650 B2
(45) Date of Patent: Aug. 19, 2025

(54) BATTERY-OPERATED MEASUREMENT DEVICE

(71) Applicant: VEGA Grieshaber KG, Wolfach (DE)

(72) Inventors: Levin Dieterle, Oberwolfach (DE); Roland Welle, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 64 days.

(21) Appl. No.: 17/263,665

(22) PCT Filed: Jul. 4, 2019

(86) PCT No.: PCT/EP2019/067970
§ 371 (c)(1),
(2) Date: Jan. 27, 2021

(87) PCT Pub. No.: WO2020/025251
PCT Pub. Date: Feb. 6, 2020

(65) Prior Publication Data
US 2021/0215525 A1  Jul. 15, 2021

(30) Foreign Application Priority Data

Aug. 2, 2018 (DE) ...................... 10 2018 212 965.7

(51) Int. Cl.
*G01F 15/18* (2006.01)
*G01F 23/284* (2006.01)
(52) U.S. Cl.
CPC ............ *G01F 15/18* (2013.01); *G01F 23/284* (2013.01)
(58) Field of Classification Search
CPC ................................ G01F 15/18; G01F 23/284
(Continued)

(56) References Cited

U.S. PATENT DOCUMENTS 6,600,103 B1 *  7/2003  Schmidt ............... H01Q 19/062
                                                 174/559
8,970,395 B2     3/2015  Nilsson et al.
(Continued)

FOREIGN PATENT DOCUMENTS

CN    102829814 A      12/2012
CN    104931940 A  *    9/2015
(Continued)

OTHER PUBLICATIONS

Chinese Reference CN 104931940A (Year: 2015).*
(Continued)

*Primary Examiner* — Peter J Macchiarolo
*Assistant Examiner* — Rodney T Frank
(74) *Attorney, Agent, or Firm* — Oblon, McClelland, Maier & Neustadt, L.L.P.

(57) ABSTRACT

A battery-operated measuring device with a housing in which a magnetic switch is located is described. An adhesive layer is attached to the outside of the housing, with which the measuring device can be stuck to a desired measuring location. The adhesive layer is covered by a protective film. The protective film is connected to a magnet, so that pulling off the protective film from the adhesive layer is accompanied by removing the magnet from the housing. The removal of the magnet from the housing leads to a switching of the magnetic switch, whereby the power supply of the electronic sensor circuitry of the measuring device is activated.

15 Claims, 2 Drawing Sheets

(58) Field of Classification Search
USPC .......................................... 73/290 R, 290 V
See application file for complete search history.

(56) References Cited

U.S. PATENT DOCUMENTS

| | | | | |
|---|---|---|---|---|
| 2005/0225480 | A1* | 10/2005 | Fehrenbach | G01S 7/032 |
| | | | | 73/290 R |
| 2006/0142651 | A1 | 6/2006 | Brister et al. | |
| 2006/0155180 | A1 | 7/2006 | Brister et al. | |
| 2006/0183984 | A1 | 8/2006 | Dobbles et al. | |
| 2006/0183985 | A1 | 8/2006 | Brister et al. | |
| 2006/0200020 | A1 | 9/2006 | Brister et al. | |
| 2006/0200970 | A1 | 9/2006 | Brister et al. | |
| 2006/0235285 | A1 | 10/2006 | Brister et al. | |
| 2007/0038044 | A1 | 2/2007 | Dobbles et al. | |
| 2007/0059196 | A1 | 3/2007 | Brister et al. | |
| 2007/0163880 | A1 | 7/2007 | Woo et al. | |
| 2010/0081908 | A1 | 4/2010 | Dobbles et al. | |
| 2011/0156497 | A1* | 6/2011 | Karren | H01M 10/48 |
| | | | | 307/139 |
| 2011/0188237 | A1 | 8/2011 | Griffiths et al. | |
| 2014/0257065 | A1 | 9/2014 | Brister et al. | |
| 2015/0371511 | A1* | 12/2015 | Miller | G01S 19/16 |
| | | | | 340/545.6 |
| 2015/0373487 | A1 | 12/2015 | Miller et al. | |

FOREIGN PATENT DOCUMENTS

| | | | |
|---|---|---|---|
| CN | 205543216 U | * | 8/2016 |
| CN | 107642279 A | | 1/2018 |
| DE | 20 2011 004 772 U1 | | 7/2011 |
| EP | 1 962 686 B1 | | 11/2009 |
| KR | 10-2017-0008244 A | | 1/2017 |
| KR | 10-2017-0140173 | | 12/2017 |
| KR | 10-2018-0122387 A | | 11/2018 |
| KR | 10-2018-0132098 A | | 12/2018 |
| WO | WO 2014/179343 A1 | | 11/2014 |
| WO | WO 2015/181770 A2 | | 12/2015 |
| WO | 2017/149475 A1 | | 9/2017 |
| WO | WO-2018057911 A1 | * | 3/2018 ........... H05K 1/0286 |

OTHER PUBLICATIONS

Chinese Reference CN 205543216 U (Year: 2016).*
German Office Action issued Jan. 30, 2019 in German Patent Application No. 102018212965.7, 10 pages.
European Office Action issued Dec. 18, 2020 in European Patent Application No. 19748690.5, 7 pages.
"Assembly instruction, Monorail and AMS, Profile rail guides and integrated measuring systems," Schneeberger Linear Technology, 2010, 120 pages (with English machine translation).
International Preliminary Report on Patentability and Written Opinion issued Feb. 11, 2021 in PCT/EP2019/067970 (submitting English translation only), 7 pages.
European Office Action issued Jul. 26, 2021 in European Patent Application No. 19 748 890.5, 35 pages.
Office Action dated May 29, 2023, issued in corresponding Korean patent application No. 10-2021-7004388 (with English translation).
Korean Notice of Allowance issued Oct. 30, 2023 in Korean Patent Application No. 10-2021-7004388 (with English Translation), 5 pages.
Office Action dated Nov. 27, 2023, issued in counterpart CN Application No. 201980050750.0 filing date of Jul. 4, 2019, with English machine translation, (18 pages).
International Search Report issued on Oct. 24, 2019 in PCT/EP2019/067970 filed on Jul. 4, 2019, 2 pages.

* cited by examiner

BATTERY-OPERATED MEASUREMENT DEVICE

REFERENCE TO RELATED APPLICATIONS

The present application claims priority from German Patent Application No. 10 2018 212 965.7, filed Aug. 2, 2018, which is incorporated herein by reference in its entirety.

FIELD OF INVENTION

The invention relates to a battery-operated measuring device with an adhesive layer for attaching the measuring device to a desired measuring location The measuring device can be configured in particular for fill level measurement, in particular for radar-based fill level measurement. Furthermore, the invention relates to a method for putting a measuring device into operation.

TECHNOLOGICAL BACKGROUND

In battery-operated electronic consumer products and/or measuring devices, plastic foils are regularly used as an insulator between the battery and the voltage tap of the electronics in order to prevent the battery from discharging before the measuring device is put into operation. When delivered, the electronics of the measuring device are thus separated from the power supply by the plastic film. To put the measuring device into operation, the plastic foil is removed by the operator, closing the contact between the battery and the voltage tap. To remove the plastic foil, the housing of the measuring device includes an opening at at least one point.

Measuring devices, such as industrial measuring devices, are often operated in environments where explosive or corrosive gases or liquids may occur, which should not come into contact with the electronics and sensors of the measuring device. Furthermore, dust particles can occur, especially electrically conductive dust particles, which can negatively affect the electronics and sensor technology. This can be relevant for tank farms or chemical factories, such as refineries or paint manufacturing factories.

For example, in tank farms and chemical factories, measuring devices can be used to detect the fill level of a filling material in a container. The filling material can in particular be a liquid or a bulk material. The fill level can be measured by radar-based methods, whereby radar signals are emitted onto the product surface. The running time of the radar signal from the fill level measuring device to the product surface and back is proportional to the length of the distance covered, so that the fill level can be determined from the measured running time, knowing the position of the fill level measuring device and the vessel geometry. It is often necessary to record other measurement variables, for example temperature.

For safe and reliable operation of measuring devices, such as fill level measuring devices, it may be necessary that the electronics and sensor technology do not come into contact with liquids and gases in the environment of the measuring device. This may require that the opening in the housing of the measuring device be sealed for connection and/or commissioning of a power supply. Up to now, this has led to complex manufacturing processes that are associated with correspondingly high manufacturing costs.

SUMMARY OF THE INVENTION

With embodiments of the invention, a battery-powered measuring device that can be easily manufactured can be advantageously provided.

This is achieved by the subject matter of the independent patent claims. Further embodiments are incorporated in the dependent claims and the following description.

A first aspect of the invention relates to a measuring device comprising a housing with an electronic sensor circuitry arranged therein for detecting a measured quantity, a battery for supplying power to the electronic sensor circuitry, a magnetic switch, a magnet for actuating the magnetic switch, an adhesive layer, and a protective film (and/or foil) for covering the adhesive layer. The adhesive layer is arranged on the outside of the housing and is configured for attaching the measuring device to a desired measuring location, wherein the protective film is connected to the magnet such that peeling the protective film from the adhesive layer results in removal of the magnet from the housing. Further, the measuring device is configured such that removal of the magnet from the housing switches the magnetic switch from a first switch state to a second switch state, wherein in the first switch state at least a portion of the electronic sensor circuitry is not powered by the battery, and wherein in the second switch state the at least portion of the electronic sensor circuitry is powered by the battery.

By providing the protective film with the magnet connected thereto, it can be advantageously ensured that the battery does not discharge during storage of the measuring device. Furthermore, by activating the power supply by pulling off the protective film, on the one hand the power supply can be activated in a simple and intuitive way for a user and, on the other hand, at the same time the adhesive layer can be exposed, which is provided and/or configured for attaching the measuring device to the measuring location, for example to a container. In this way, it can be ensured that the measuring device does not consume any energy before being put into operation and/or attached to the measuring location, i.e. before the protective film is removed, and that when the measuring device is put into operation and/or attached to the measuring location, the energy supply is automatically activated without requiring any further step on the part of the user to put the device into operation. Also, due to the activation of the energy supply via the magnetic switch, the housing can be configured in an advantageous manner to be completely closed, so that the components of the measuring device arranged therein can be comprehensively and reliably protected from external influences.

For example, the measuring device can achieve a high International Protection (IP) rating, such as IP 68 and/or 69. In addition, in an advantageous manner, the battery can be prevented from discharging before the measuring device is put into operation to increase the battery life and/or the operating time of the measuring device, as well as to improve the storability of the measuring device.

The electronic sensor circuitry can be configured to detect various measurement variables, such as fill level (or filling level), limit level and/or any other measurement variable (such as temperature and/or pressure). In particular, the electronic sensor circuitry can be configured to detect the fill level and/or a limit level of a product, for example by means of a radar-based fill level and/or limit level measurement, in a container. For this purpose, the electronic sensor circuitry can include an antenna. For example, a parabolic antenna, a horn antenna, a Cassegrain antenna, a patch antenna and/or an antenna group can be used. The control of the antenna array can be configured adaptively, for example, in order to be able to adjust the directional characteristic of the antenna array, for example, to achieve strong beam bundling.

The electronic sensor circuitry can further comprise a transmit-receive switch (duplexer), via which it is possible to switch between transmit and receive processes. In particular, the transmit/receive switch can be configured to allow time discrimination between the radar signal which can be emitted by the electronic sensor circuitry (also called transmit signal) and a part of the radar signal reflected by the medium (also called receive signal).

To detect a measurement variable (and/or measurand and/or measured variable) such as the fill fill level of a product in a container, the electronic sensor circuitry can use both analog and digital signal processing methods. Accordingly, the electronic sensor circuitry may include, for example, at least one amplifier, low-pass filter, frequency mixer and/or band-pass filter for analog signal processing. Further, the electronic sensor circuitry may include an analog-to-digital converter for sampling and quantizing analog signals. In addition, the electronic sensor circuitry may include one or more processors for digital signal processing, for example, a microprocessor, digital signal processor, and/or other application specific instruction set processors (ASIPs). In addition, the electronic sensor circuitry may include at least one dedicated memory device for data and/or program code, particularly a volatile or non-volatile memory. Furthermore, the electronic sensor circuitry may include one or more application specific integrated circuits (ASICs).

For example, the measuring device may be configured to perform measurements in environments where dust, liquids or gases occur that may affect operation of the electronic sensor circuitry. Furthermore, it may be necessary to perform measurements in environments where explosive gases occur. For safe and reliable operation of the measuring device in such environments, the housing of the measuring device may be configured to completely enclose the electronic sensor circuitry, the battery, and the magnetic switch. In particular, the housing of the measuring device may be configured such that it cannot be opened, so that, for example, the battery for supplying power to the electronic sensor circuitry cannot be replaced. In particular, in the case of non-replaceable batteries, discharging of the battery can be prevented in an advantageous manner before the measuring device is put into operation by means of the magnet and the magnetic switch.

The measuring device can include several batteries to supply power to the electronic sensor circuitry. The batteries can be connected in series or in parallel, for example. It is also possible that different batteries supply different components of the electronic sensor circuitry with electrical energy. Here and in the following, the term "battery" includes a primary cell, a secondary cell, and interconnections of primary and/or secondary cells. Therefore, the term "battery" refers to both rechargeable and non-rechargeable storage devices for electrical energy, such as those based on electrochemistry.

The adhesive layer of the measuring device is arranged on the outside of the housing of the measuring device and is configured for attaching the measuring device to a desired measuring location. For example, in a measuring device for measuring the fill level of a filling material in a container, the adhesive layer can be configured for a material-fit attachment of the measuring device to a wall of the container in which the fill level is to be measured. The adhesive layer may have a size of, for example, about 6×6 cm2. However, it is also possible that larger or smaller adhesive layers are used. The adhesive layer can have any geometry, such as a round, oval, elliptical, square, polygonal and/or rectangular geometry.

The adhesive layer is covered by a protective film that is bonded to the magnet, so that peeling the protective film from the adhesive layer results in removal of the magnet from the housing. For example, the magnet may be bonded to the protective film. However, it is also possible, for example, for the protective film to completely or partially encase the magnet. The magnet is preferably a permanent magnet. This can be configured, for example, as a metallic alloy of iron, nickel and/or aluminum with additions of cobalt, manganese and copper or also as a ceramic material. When the protective film is removed from the adhesive layer, the magnet is simultaneously removed from the housing of the measuring device and thus also from the magnetic switch. This advantageously exposes the adhesive layer for mounting the measuring device at the measuring location and simultaneously activates the power supply.

The protective film can protrude at least partially over an edge of the adhesive layer. This enables comprehensive protection of the adhesive layer and easy removal of the protective film by a user.

Removing the magnet from the housing causes the magnetic switch to switch from a first switch state to a second switch state. Here and hereinafter, a magnetic switch is a switch that is switched and/or actuated by a magnetic field. For example, the magnetic switch may be a reed switch. In particular, in the first switch state, an electrical contact may be open, while in the second switch state, the electrical contact is closed. Thus, the measuring device may be configured such that an electrical circuit is interrupted in the first switch state, and/or that the electrical circuit is closed in the second switch state.

The measuring device is configured so that in the first switch state of the magnetic switch, the battery does not supply at least part of the electronic sensor circuitry with energy. Switching the magnetic switch to the second switch state results in the part of the electronic sensor circuitry being supplied with energy. The part of the electronic sensor circuitry that is not energized in the first switch state may be, for example, a part of the electronic sensor circuitry that consumes a lot of energy, such as more than another part of the electronic sensor circuitry. The measuring device may also be configured to power the entire electronic sensor circuitry from the battery in the second switch state, and/or to completely disconnect the electronic sensor circuitry from the battery in the first switch state. By not having the battery power at least a portion of the electronic sensor circuitry in the first switch state of the magnetic switch, the power consumption of the measuring device can be reduced prior to startup, thereby extending the life of the battery.

Removing the protective film from the adhesive layer can therefore, on the one hand, expose the adhesive layer for attaching the measuring device at the desired measuring location. On the other hand, battery operation is activated, i.e. removing the protective film from the adhesive layer also causes the electronic sensor circuitry to be supplied with power by the battery. Coupling the effects achieved by removing the protective film simplifies the commissioning of the measuring device. In particular, in the case of measuring locations that are difficult to access, it also comes into play that the measuring device according to the invention cannot be attached to the measuring location without activating the battery operation. It can therefore be ruled out that the battery is not activated unintentionally.

According to a further embodiment, the housing completely encloses the battery, the electronic sensor circuitry and the magnetic switch. In particular, the measuring device may not include a plastic film for insulating the battery prior to start-up. Thus, the housing of the measuring device may also have no opening for removing the plastic film.

The housing can form a closed interior in which the electronic sensor circuitry, the battery and the magnetic switch are arranged. Due to the completely enclosing housing, the electronic sensor circuitry, the battery and the magnetic switch can be protected from dust, gases and liquids in the environment of the measuring device. This can enable safe and reliable operation of the measuring device. For example, a fill level measuring device with a completely enclosing housing can be operated inside or outside the container in which the fill level is to be measured.

In this case, the housing of the measuring device is configured to enable the measurement of the measured value to be detected through the housing. In particular, if the measuring device is configured as a radar-based fill level measuring device, the housing can, for example, be made of a plastic that can be substantially transparent to the radar signal. Alternatively, only a portion of the housing may be transparent to the radar signal emitted by the electronic sensor circuitry, and the electronic sensor circuitry may be configured to allow the radar signal to propagate through the transparent portion of the housing.

In particular, the housing can be configured in such a way that a radar signal emitted by the electronic sensor circuitry can be transmitted through the housing, in particular through a housing wall. For example, the housing can be made of a plastic, for example polyethylene (PE) and/or high-density polyethylene (HDPE), which is essentially transparent to the radar signal emitted by the electronic sensor circuitry. It is also possible that only a section of the housing is transparent to the radar signal emitted by the electronic sensor circuitry, and/or the electronic sensor circuitry may be configured to propagate the radar signal through the transparent section of the housing. It may also be provided that, in at least a portion of the housing through which the radar signal is emitted and received, a thickness of the housing wall is selected such that the radar signal is not absorbed or is only slightly absorbed by the housing. A thickness and/or wall thickness of the housing wall may be approximately in a range of 1 mm to 5 mm, for example to ensure sufficient mechanical stability. In the partial area, the thickness of the housing may be less than in another partial area of the housing.

According to an embodiment, the housing encloses the battery, the electronic sensor circuitry and the magnetic switch hermetically, in particular dust-tight, watertight and/or airtight. For example, the housing of the measuring device may be configured and/or constructed to achieve protection class IP 68 and/or IP 69, i.e., it is dust-tight and provides protection against ingress of water even in the event of permanent submersion. In addition, the housing may be configured to prevent gases from entering the interior of the housing. This may be relevant, for example, in chemical industry plants where explosive or corrosive gases may occur.

According to a further embodiment, the electronic sensor circuitry is configured to measure a fill level in a container by means of radar and/or the desired measurement location is a container wall. The electronic sensor circuitry can include an antenna from which a radar signal can be emitted in the direction of the product surface. The electronic sensor circuitry can be configured to determine the propagation time between the emission of the radar signal (or transmit signal) and the reception of the radar signal (or receive signal) reflected by the product surface. For example, if the propagation speed of the radar signal in the medium between the measuring device and the product surface is known, the distance between the measuring device and the product surface can be calculated and/or determined from the running time of the radar signal.

In many applications, this propagation speed can be approximated sufficiently accurately with the speed of light. For example, the product height can be determined if the height of the measuring device above the vessel bottom is known in advance. Since the radar signal is sometimes only partially reflected by the product surface, while another part of the radar signal propagates through the product, the fill level can also be measured by determining the time interval between receiving the part of the radar signal reflected from the product surface and receiving the part of the radar signal reflected from the vessel bottom. The velocity of the radar signal within the product must be taken into account.

For example, the container wall may be made of a plastic such as polyethylene or polypropylene. The measuring device may be arranged outside the container, with the radar signal propagating through the housing of the measuring device and the container wall. However, it is also possible for the measuring device to be located inside the container in which the fill level is to be measured. Depending on the intended measurement location, the adhesive layer can therefore be placed either on the upper or lower side of the measuring device, as well as the magnetic switch accordingly.

According to a further embodiment, the adhesive layer includes a recess for the magnet and/or the magnet is arranged in a recess between the housing and the protective film. The recess in the adhesive layer for receiving the magnet can, on the one hand, prevent the magnet from sticking to the adhesive layer. For example, the magnet can be configured as a magnetic platelet that is connected to the protective film on one side without the risk of the opposite side of the magnetic platelet sticking to the adhesive layer. On the other hand, the magnet can be arranged closer to the housing and the magnetic switch arranged therein due to the recess in the adhesive layer. By reducing the distance to the magnetic switch, it can be achieved that the magnet generates a stronger magnetic field in the area of the magnetic switch, so that the magnet reliably holds the magnetic switch in the first switch state.

According to a further embodiment, the housing is configured to enable measurement through the housing and/or detection of the measurement variable by means of the electronic sensor circuitry through the housing, in particular through a housing wall. This can be particularly advantageous if the housing completely encloses the electronic sensor circuitry, the battery and the magnetic switch.

According to a further embodiment, the housing comprises at least two housing components, and the at least two housing components are joined by means of welding and/or bonding. For example, the housing may comprise two housing components which are glued together by means of a suitable adhesive and/or joined by means of ultrasonic welding, so that the joint may comprise the melted material of the two housing components. By welding and/or bonding the housing components, a housing that is impermeable to dust, liquids or gases can be produced, which can protect the electronic sensor circuitry, the battery and the magnetic switch, for example, from aggressive media or explosive gases.

Preferably, the at least two housing components are made of the same plastic (for example, polyethylene or polypropylene). In particular, the housing can be made of two identical housing half parts. However, it is also possible that different housing components are made of different materials.

According to a further embodiment, the housing of the radar sensor is manufactured entirely of plastic, in particular a thermoplastic. This enables cost-effective production by means of injection molding.

In particular, it is advantageous if the housing is manufactured of a plastic with low relative permittivity (1.5-3) such as polyethylene or polypropylene. Since the measurement of the radar sensor is manufactured through the housing, this reduces the ringing of the antenna, improves the received signal quality at close range, and thus reduces the blocking distance of the sensor. The blocking distance is the distance within which no or no reliable measurement/evaluation of the received signals is possible.

According to a further embodiment, the housing is injection molded in one piece from plastic. A housing injection molded in one piece from plastic is particularly advantageous because it has no joints at which different housing components are connected to one another and at which leaks can occur. Overmolding the electronic sensor circuitry, the battery and the magnetic switch to form a one-piece housing can therefore result in a particularly safe and robust measuring device, for example for radar-based fill level measurement.

According to another embodiment, the magnetic switch is a reed switch. The reed switch may include a magnetic switching tongue that can move when the magnet is removed from the housing and thus the magnetic switch, so that the switch can be switched from the first to the second switch state and vice versa. The movement of the magnetic switch tongue can close and/or open an electrical contact. In other words, the reed switch can be held and/or switched in an open (or first) and/or a closed (or second) switch state by the magnetic field of the magnet connected to the protective film. The switch state may change when the magnet is removed from the magnetic switch by peeling the protective film from the adhesive layer.

A reed switch may also include two magnetic switch tongues that move relative to each other when the magnet is removed from the housing/magnet switch. Further, a second magnet may be disposed in the housing of the measuring device to hold the reed switch in the second switch state as long as there is no magnetic field acting from outside the housing.

According to a further embodiment, the measuring device comprises a communication circuitry arranged in the housing, wherein the communication circuitry is arranged to enable wireless transmission of measurement data through the housing. For this purpose, the communication circuitry may in particular use known technologies such as Bluetooth (e.g. Bluetooth Low Energy), ZigBee, Wi-Fi (e.g. Wi-Fi HaLow) and/or cellular mobile radio standards such as 2G, 3G or 4G (e.g. LTE Cat 0). The communication circuitry may also be arranged to provide an optical communication link. Thus, the communication circuitry may include a Bluetooth module, a radio module, a WLAN module, and/or an infrared module.

The communication circuitry can be configured to send measured values at fixed times, in particular periodically.

The communication circuitry can also be configured to receive and process messages and/or control signals from other devices. For example, the communication circuitry may be configured to receive and process a message and/or control signal with which another device requests a measured value. The communication circuitry may be arranged to trigger and/or cause the electronic sensor circuitry to perform a measurement in response to the control signal. Further, the communication circuitry may be arranged to send the measurement value determined by the electronic sensor circuitry in response to the trigger in response to the measurement value request and/or the control signal from the other device.

The communication circuitry may further be arranged to receive and process a message and/or a control signal from another device with which the other device communicates a measured value. The communication circuitry can be configured to correct the measured value determined by the electronic sensor circuitry of the measuring device using the measured value received from the other device, for example to send the corrected measured value. Parameterization data for parameterizing the measuring device can also be received by means of the communication circuitry.

Instead of or in addition to the communication circuitry, the measuring device can include a display device, in particular an energy-efficient display device, for example a liquid crystal display, via which the measured value determined by the electronic sensor circuitry is displayed.

A second aspect of the invention relates to a method for commissioning a measuring device as described above and below. The method comprises a step of activating the power supply of the electronic sensor circuitry by the battery by peeling off the protective film from the adhesive layer, and a step of attaching the measuring device to the desired measuring location by means of the adhesive layer. In this case, peeling off the protective film from the adhesive layer leads, on the one hand, to the adhesive layer being exposed for attaching the measuring device to the desired measuring location and, on the other hand, to the electronic sensor circuitry being supplied with power by the battery. By coupling the effects achieved by removing the protective film, the commissioning of the measuring device is simplified. In addition, it can be avoided that the battery is unintentionally not activated when the measuring device is placed at the measuring location. This can be particularly relevant if the measurement is to be carried out at a measurement location that is difficult to access.

Features, elements and/or functions of the measuring device as described above and below may be features, elements and/or steps of the method for putting the measuring device into operation as described above and below, and vice versa.

According to an example of the present disclosure, the measuring device may comprise a housing with an electronic sensor circuitry arranged therein for detecting a measured quantity, a battery for supplying power to the electronic sensor circuitry, a switch, an adhesive layer, and a protective film for covering the adhesive layer. In this regard, the adhesive layer may be arranged on the outside of the housing and may be implemented for attaching the measuring device to a desired measuring location. The measuring device may be configured for the protective film to hold the housing under tension, such that peeling the protective film from the adhesive layer may cause mechanical deformation of the housing. The measuring device may be further configured such that the mechanical deformation of the housing causes the switch to switch from a first switch state to a second switch state, wherein in the first switch state at least a portion of the electronic sensor circuitry is not powered by the battery, and wherein in the second switch state the portion of the electronic sensor circuitry is powered by the battery.

According to another example of the present disclosure, the measuring device may comprise a housing with an electronic sensor circuitry arranged therein for detecting a measured quantity, a battery for supplying power to the electronic sensor circuitry, an adhesive layer, and a protective film for covering the adhesive layer. In this context, the adhesive layer may be arranged on the outside of the housing and may be configured for attaching the measuring device to a desired measuring location. At least a part of the electronic sensor circuitry may not be powered by the battery. However, the measuring device may be configured such that peeling the protective film from the adhesive layer triggers a chemical reaction, in particular a reaction with atmospheric oxygen. The measuring device may be further configured to cause an electrical contact to be closed by the chemical reaction. The closing of the electrical contact may cause the part of the electronic sensor circuitry to be supplied with energy from the battery.

According to another example of the present disclosure, the measuring device may comprise a housing with an electronic sensor circuitry arranged therein for detecting a measurement variable, a battery for supplying power to the electronic sensor circuitry, an electronic switch, an adhesive layer, and a protective film for covering the adhesive layer. The electronic switch may in particular be a transistor. In this case, the adhesive layer may be arranged on the outside of the housing and may be configured for attaching the measuring device to a desired measuring location. The protective film may be electrostatically charged such that peeling off the protective film from the adhesive layer switches the electronic switch from a first switch state to a second switch state, wherein in the first switch state at least a part of the electronic sensor circuitry is not supplied with energy by the battery and wherein the part of the electronic sensor circuitry in the second switch state is supplied with energy by the battery.

In the following, embodiments of the invention are described with reference to the figures.

Similar, similar-appearing, identical or identical-appearing elements in the figures are given similar or identical reference signs. The figures are merely schematic and not to scale.

DETAILED DESCRIPTION OF EXEMPLARY EMBODIMENTS

Figure 1:
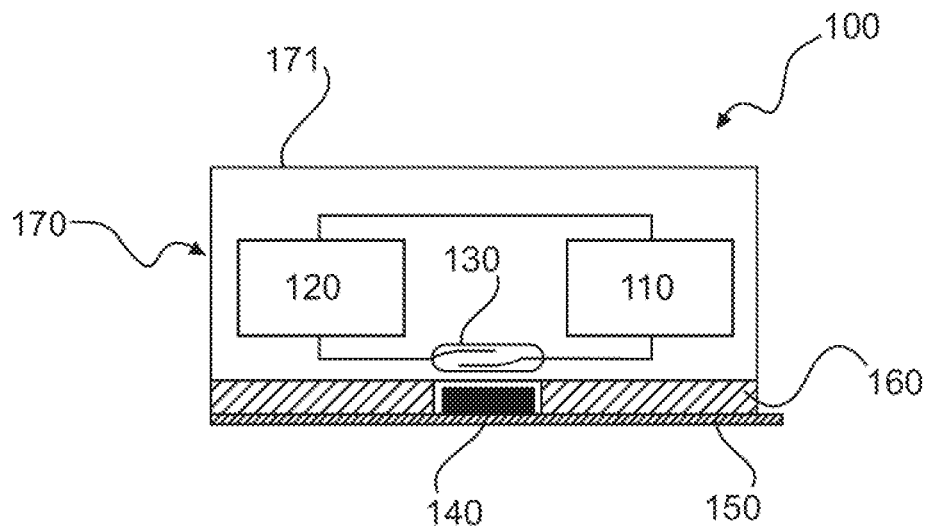
FIG. 1 schematically shows a measuring device according to the invention.

FIG. 1 schematically shows a measuring device 100 according to the invention. The measuring device 100 includes an electronic sensor circuitry 120, a battery 110 for supplying power to the electronic sensor circuitry, and a magnetic switch 130. Further, the measuring device includes a housing 170 with a housing wall 171 which completely encloses the electronic sensor circuitry, the battery and the magnetic switch so that dust, moisture and/or air and/or explosive gas cannot enter the interior space enclosed by the housing. The battery may not be replaceable due to the enclosed housing. The magnetic switch may be configured as a reed switch. The reed switch isolates at least a portion of the electronic sensor circuitry from the power supply from the battery as long as the magnet 140 holds the magnetic switch 130 open and/or in a first switch state. An adhesive layer 160 is provided on the outside of the housing 170 of the measuring device 100 for attaching the measuring device to a desired measuring location. The adhesive layer is covered by a protective film 150. A magnet 140 is connected to the protective film. When the protective film 150 is removed from the adhesive layer 160 to attach the measuring device, the magnet 140 is simultaneously removed from the magnetic switch 130. This causes the magnetic switch to close or switch to the second switch state, so that the electronic sensor circuitry is supplied with power from the battery and the device starts its operation.

Figure 2:
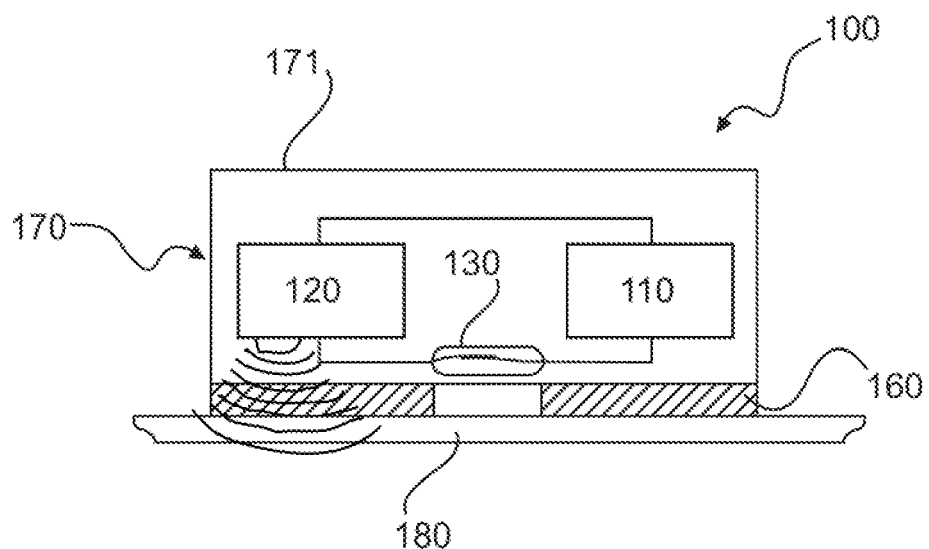
FIG. 2 shows the measuring device attached to a measuring location according to FIG. 1.

FIG. 2 schematically shows the measuring device 100 according to FIG. 1 after the protective film with the magnet has been removed from the adhesive layer 160 and the measuring device has been attached to the desired measuring location 180. The desired measuring location 180 is, for example, a container wall. In this case, the adhesive layer 160 provides a material connection between the measuring location 180 and the housing 170 of the measuring device. During the battery life, the measuring device can record measurement data of the container contents on the one hand and measurement data of the environment on the other hand through the housing 170 and the container wall 180. In this case, the container wall is preferably made of plastic (polyethylene, polyethylene). The measurement data are, for example, measurement data correlating with a filling level and/or a filling height of a medium in a container. This can be measured in particular by means of radar-based methods. However, other measurement data such as temperature, for example ambient temperature, and/or pressure, for example air pressure, are also conceivable.

FIG. 2 further illustrates that removal of the magnet from the magnetic switch 130 causes the magnetic switch to close or transition to the second switch state, such that the battery 110 supplies power to the electronic sensor circuitry 120.

Figure 3:
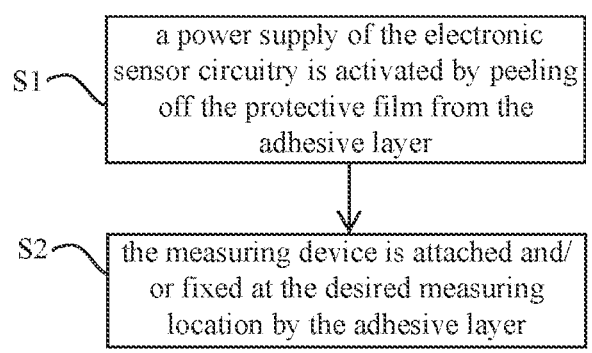
FIG. 3 shows a flowchart illustrating steps of a method for commissioning the measuring device according to an embodiment of the invention.

FIG. 3 shows a flowchart illustrating steps of a method for commissioning the measuring device 100 according to an embodiment of the invention. Unless otherwise described, the measuring device 100 of FIG. 3 may have the same features and elements as the measuring device 100 of FIGS. 1 and 2.

In a first step S1, a power supply of the electronic sensor circuitry 120 by the battery 110 is activated by peeling off the protective film 150 from the adhesive layer 160. In a further step S2, the measuring device 100 is attached and/or fixed at the desired measuring location 180 by means of the adhesive layer 160.

Further, it should be noted that "comprising" and "comprising" do not exclude other elements or steps, and the indefinite articles "one" or "a" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A fill level measuring device, comprising:
a housing with electronic sensor circuitry disposed therein, the electronic sensor circuitry being configured to detect a fill level measurement variable;
a battery configured to supply power to the electronic sensor circuitry;
a magnetic switch;
a magnet configured to actuate the magnetic switch;
an adhesive layer; and
a protective film that covers the adhesive layer,
wherein the adhesive layer is disposed on an outside of the housing and is configured to attach the fill level measuring device to a measuring location,
wherein the protective film is bonded to the magnet such that peeling the protective film from the adhesive layer results in removal of the magnet from the housing,
wherein the fill level measuring device is configured such that removal of the magnet from the housing switches the magnetic switch from a first switch state to a second switch state,
wherein, in the first switch state, at least one portion of the electronic sensor circuitry is not powered by the battery,
wherein the at least one portion of the electronic sensor circuitry is powered by the battery in the second switch state,
wherein the electronic sensor circuitry is further configured to measure a filling level in a container by way of radar and wherein the measurement location is a container wall,
wherein the container wall and the housing are made of materials being transparent to the radar signal,
wherein the adhesive layer includes a recess for the magnet and wherein the magnet is disposed in a recess sandwiched between the housing and the protective film,
wherein the housing hermetically encloses the battery, the electronic sensor circuitry, and the magnetic switch in a dust-tight, water-tight and/or air-tight manner,
wherein the magnet is configured as a magnetic plate that is connected to the protective film on one side.

2. The fill level measuring device according to claim 1, wherein the housing completely encloses the battery, the electronic sensor circuitry, and the magnetic switch.

3. The fill level measuring device according to claim 1, wherein the housing is further configured to enable detection of the fill level measurement variable by way of the electronic sensor circuitry through the housing.

4. The fill level measuring device according to claim 1, wherein the housing is further configured to enable detection of the fill level measurement variable by way of the electronic sensor circuitry through a housing wall of the housing.

5. The fill level measuring device according to claim 1, wherein the housing includes at least two housing components, and
wherein the at least two housing components are joined by welding and/or bonding.

6. The fill level measuring device according to claim 1, wherein the housing is injection molded in one piece from plastic material.

7. The fill level measuring device according to claim 1, wherein the housing is manufactured entirely from a plastic material.

8. The fill level measuring device according to claim 1, wherein the housing is manufactured entirely from a thermoplastic plastic material.

9. The fill level measuring device according to claim 1, wherein the magnetic switch is a reed switch.

10. The fill level measuring device according to claim 1, further comprising:
communication circuitry located in the housing,
wherein the communication circuitry is configured to enable wireless transmission of measurement data through the housing.

11. A method of commissioning a fill level measuring device including a housing with electronic sensor circuitry disposed therein, the electronic sensor circuitry being configured to detect a fill level measurement variable, a battery configured to supply power to the electronic sensor circuitry, a magnetic switch, a magnet configured to actuate the magnetic switch, an adhesive layer, and a protective film that covers the adhesive layer, wherein the adhesive layer is disposed on an outside of the housing and is configured to attach the fill level measuring device to a measuring location, wherein the protective film is bonded to the magnet such that peeling the protective film from the adhesive layer results in removal of the magnet from the housing, wherein the fill level measuring device is configured such that removal of the magnet from the housing switches the magnetic switch from a first switch state to a second switch state, wherein, in the first switch state, at least one portion of the electronic sensor circuitry is not powered by the battery, and wherein the at least one portion of the electronic sensor circuitry is powered by the battery in the second switch state, the method comprising:
activating a power supply of the electronic sensor circuitry by the battery by peeling off the protective film from the adhesive layer; and
attaching the fill level measuring device to the measuring location by way of the adhesive layer,
wherein the electronic sensor circuitry is further configured to measure a filling level in a container by way of radar and/or wherein the measurement location is a container wall;
wherein the container wall and the housing are made of materials being transparent to the radar signal;
wherein the adhesive layer includes a recess for the magnet and wherein the magnet is disposed in a recess sandwiched between the housing and the protective film,
wherein the housing hermetically encloses the battery, the electronic sensor circuitry, and the magnetic switch in a dust-tight, water-tight and/or air-tight manner, and
wherein the magnet is configured as a magnetic plate that is connected to the protective film on one side.

12. The method according to claim 11, further comprising:
measuring, using the electronic sensor circuitry, a filling level in a container by way of radar.

13. The method according to claim 11, further comprising:
detecting the fill level measurement variable by way of the electronic sensor circuitry through the housing.

14. The method according to claim 11, further comprising:
detecting the fill level measurement variable by way of the electronic sensor circuitry through a housing wall of the housing.

15. The method according to claim 11, further comprising:
   wirelessly transmitting, using communication circuitry located in the housing, measurement data through the housing.

* * * * *